US012580352B2

(12) United States Patent
Kim et al.

(10) Patent No.: US 12,580,352 B2
(45) Date of Patent: Mar. 17, 2026

(54) PLUG CONNECTOR COUPLED TO RECEPTACLE CONNECTOR

(71) Applicants: Sensorview Co., LTD., Seongnam-si (KR); Okins Electronics Co., LTD., Uiwang-si (KR)

(72) Inventors: Byoung Nam Kim, Bucheon-si (KR); Kyoung Il Kang, Suwon-si (KR); Jong Hyup Lim, Hwaseong-si (KR); Jae Kun Choi, Suwon-si (KR); Dong Uk Lee, Suwon-si (KR); Jin Kook Jun, Gunpo-si (KR); Sung Gyu Park, Anyang-si (KR); Jong Wook Ham, Gunpo-si (KR)

(73) Assignees: SENSORVIEW CO., LTD. (KR); OKINS ELECTRONICS CO., LTD. (KR)

( * ) Notice: Subject to any disclaimer, the term of this patent is extended or adjusted under 35 U.S.C. 154(b) by 320 days.

(21) Appl. No.: 18/261,790

(22) PCT Filed: Jan. 14, 2022

(86) PCT No.: PCT/KR2022/000724

§ 371 (c)(1),
(2) Date: Jul. 17, 2023

(87) PCT Pub. No.: WO2022/154570

PCT Pub. Date: Jul. 21, 2022

(65) Prior Publication Data

US 2024/0204466 A1 Jun. 20, 2024

(51) Int. Cl.
*H01R 24/44* (2011.01)
*H01R 24/50* (2011.01)

(52) U.S. Cl.
CPC ............ *H01R 24/44* (2013.01); *H01R 24/50* (2013.01)

(58) Field of Classification Search
None
See application file for complete search history.

(56) References Cited

U.S. PATENT DOCUMENTS 6,517,379 B2 2/2003 Leve
6,893,291 B2 * 5/2005 Wendling ............ H01R 9/0518 439/585

(Continued)

FOREIGN PATENT DOCUMENTS

CN 108682990 A 10/2018
CN 109244713 1/2019

(Continued)

OTHER PUBLICATIONS

Japanese Office Action dated Jun. 25, 2024 received in related matter 2023-542648; 3 pages.

(Continued)

*Primary Examiner* — Ross N Gushi
(74) *Attorney, Agent, or Firm* — Cislo & Thomas, LLP

(57) ABSTRACT

A plug connector according to the present invention is a plug connector coupled to a receptacle connector, the plug connector comprising: a conductor for signals; a ring-shaped conductor for ground, the conductor surrounding the conductor for signals; a ring-shaped insulator surrounding the conductor for signals and being surrounded by the conductor for ground, and insulating between the conductor for signals and the conductor for ground; a lower body; and an upper body coupled onto the lower body, wherein the conductor for signals includes a lower portion protruding below a first portion on the insulator, a middle portion inserted into a hollow portion of the first portion, and an upper portion protruding above the first portion, and the conductor for ground includes a lower portion protruding below the first portion and an upper portion surrounding the first portion, and the lower body includes a lower housing having a (Continued)

hollow portion that is vertically opened, wherein the upper portion of the conductor for ground is accommodated in the hollow portion, and the lower portion of the conductor for ground and the lower portion of the conductor for signals are exposed downwards through the hollow portion, and the upper body includes an upper housing facing the lower housing and having a hollow portion opened downwards so that the hollow portion forms a space around the upper portion of the conductor for signals.

5 Claims, 12 Drawing Sheets

(56) References Cited

U.S. PATENT DOCUMENTS

| | | | |
|---|---|---|---|
| 9,184,535 | B2 | 11/2015 | Tsuchida et al. |
| 10,797,412 | B2 | 10/2020 | Barthelmes |
| 2009/0104800 | A1 | 4/2009 | Scherer |
| 2009/0191729 | A1 | 7/2009 | Kurimoto |
| 2010/0144199 | A1 | 6/2010 | Wu |
| 2010/0184330 | A1 | 7/2010 | Wu |
| 2011/0151708 | A1 | 6/2011 | Kaneko |
| 2011/0201232 | A1 | 8/2011 | Islam |
| 2012/0322304 | A1 | 12/2012 | Taguchi |
| 2016/0043430 | A1 | 2/2016 | Lee |
| 2018/0115095 | A1 | 4/2018 | Zhu |
| 2021/0367367 | A1 | 11/2021 | Kim |
| 2024/0372301 | A1 | 11/2024 | Lim |

FOREIGN PATENT DOCUMENTS

| | | | |
|---|---|---|---|
| JP | 09320699 | | 12/1997 |
| JP | 3134082 | | 2/2001 |
| JP | 2003243103 | | 8/2003 |
| JP | 2003243103 | A | 8/2003 |
| JP | 2006344524 | A | 12/2006 |
| JP | 2007265908 | | 10/2007 |
| JP | 2017174588 | | 9/2017 |
| JP | 6390862 | | 9/2018 |
| JP | 2019-003771 | | 1/2019 |
| JP | 2019151985 | | 9/2019 |
| JP | 2020205255 | A | 12/2020 |
| KR | 200308178 | | 3/2003 |
| KR | 101586431 | B1 | 1/2016 |
| WO | 2022208247 | A1 | 10/2022 |

OTHER PUBLICATIONS

Japanese Office Action dated Jul. 2, 2024 received in related matter 2023-542647; 3 pages.

* cited by examiner

PLUG CONNECTOR COUPLED TO RECEPTACLE CONNECTOR

TECHNICAL FIELD

The present invention relates to a connector, and more particularly, to a plug connector coupled to a receptacle connector.

BACKGROUND ART

In various types of electronic devices (e.g., wired/wireless communication devices), an internal circuit is provided on a circuit board. A connector assembly including a receptacle connector and a plug connector is used to connect the circuit board to other electronic devices or other circuit boards. The receptacle connector is mounted on the circuit board, the plug connector is coupled to a cable, and the plug connector is connected to the receptacle connector, so that the cable and the circuit board are electrically connected.

Generally, electrical and physical connection between a plug connector and a cable is achieved by clamping. However, a clamp connection not only complicates the structure of a plug connector, but also leads to poor electrical and physical stability, and in the case of high-frequency signals, there may arise various problems such as unstable shielding performance and impedance matching at a clamped portion.

DETAILED DESCRIPTION OF THE INVENTION

Technical Problem

An object of the present invention is to provide a plug connector which allows electrical and physical connection between the plug connector and a cable to be achieved by soldering without clamping, thereby increasing electrical and physical stability and improving shielding performance and impedance matching.

The objects to be achieved by the present invention are not limited to the foregoing object, and additional objects, which are not mentioned herein, will be readily understood by those skilled in the art from the following description.

Technical Solution

A plug connector according to the present invention is a plug connector coupled to a receptacle connector, the plug connector including: a conductor for signals; a ring-shaped conductor for ground, the conductor surrounding the conductor for signals; a ring-shaped insulator surrounding the conductor for signals and being surrounded by the conductor for ground, and insulating between the conductor for signals and the conductor for ground; a lower body; and an upper body coupled onto the lower body, wherein the conductor for signals includes a lower portion protruding below a first portion on the insulator, a middle portion inserted into a hollow portion of the first portion, and an upper portion protruding above the first portion, and the conductor for ground includes a lower portion protruding below the first portion and an upper portion surrounding the first portion, and the lower body includes a lower housing having a hollow portion that is vertically opened, wherein the upper portion of the conductor for ground is accommodated in the hollow portion, and the lower portion of the conductor for ground and the lower portion of the conductor for signals are exposed downward through the hollow portion, and the upper body includes an upper housing facing the lower housing and having a hollow portion opened downwards so that the hollow portion forms a space around the upper portion of the conductor for signals.

The lower body of the lower housing may further include a lower guide portion configured to guide a cable toward the conductor for signals from one side of the lower housing, and the upper body may further include an upper guide portion facing the lower guide portion and configured to guide the cable toward the conductor for signals from one side of the upper housing.

The upper portion of the conductor for signals may be coupled to a signal line of the cable through soldering.

An end of a signal line of the cable may be located above the upper portion of the conductor for signals.

The lower guide portion and the upper guide portion may form a guide tube that guides the cable, and the guide tube may be formed such that an inner diameter of an inlet thereof is greater than an outer diameter of an outer conductor of the cable.

A soldering portion may be formed between an inlet portion of the guide tube and the outer conductor of the cable.

The lower guide portion may include a first lower guide groove, a second lower guide groove, and a third lower guide groove in order closest to the hollow portion of the lower body, the upper guide portion may include a first upper guide groove, a second upper guide groove, and a third upper guide groove that face, respectively, the first lower guide groove, the second lower guide groove, and the third guide groove, an exposed dielectric of the cable may be seated in the first lower guide groove and the first upper guide groove, an exposed outer conductor of the cable may be seated in the second lower guide groove and the second upper guide groove, and an inner diameter formed by the third lower guide groove and the third upper guide groove may be greater than an outer diameter of the outer conductor of the cable.

A lower neck portion and an upper neck portion may protrude respectively from one sides of the lower guide portion and the upper guide portion to surround the exposed outer conductor of the cable at a distance, and a soldering portion may be formed between inlet portions of the lower neck portion and the upper neck portion and the outer conductor.

The lower guide portion and the upper guide portion may be formed to cover a sheath of the cable, a through hole may be vertically formed at a portion of the lower guide portion or the upper guide portion where an exposed outer conductor of the cable is located, and a soldering portion may be formed on the outer conductor in the through hole and around the outer conductor.

A second portion of the lower portion of the insulator may be surrounded by the lower portion of the conductor for ground while surrounding the lower portion of the conductor for signals.

The lower body and the upper body may be formed of a conductive material.

Advantageous Effects

A plug connector according to an embodiment of the present invention allows electrical and physical connection between the plug connector and a cable to be achieved by soldering without clamping, thereby enhancing electrical and physical stability and improving shielding performance and impedance matching.

Effects of the present invention are not limited to the foregoing effects, and additional effects, which are not mentioned herein, will be readily understood by those skilled in the art from the following description.

MODE FOR INVENTION

Figure 1:
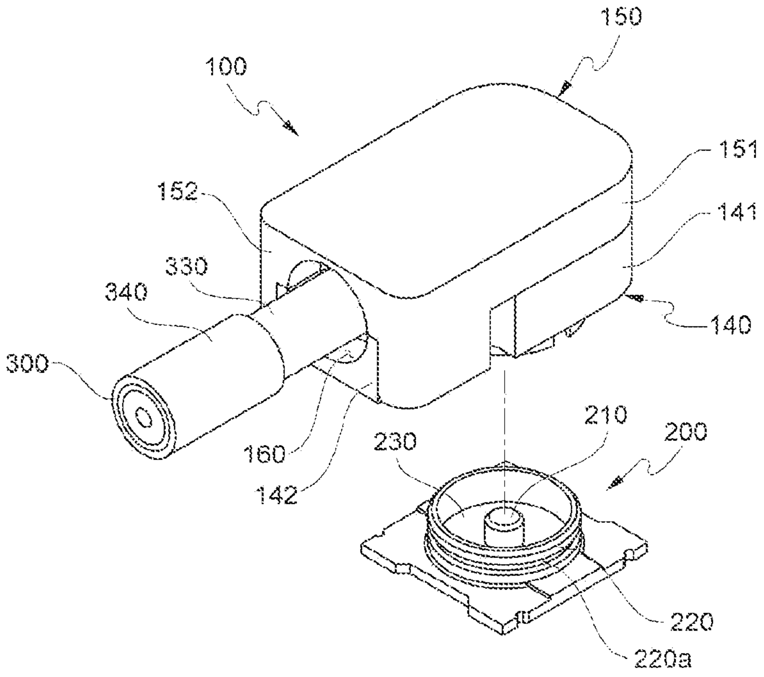
FIG. 1 is a top view of a plug connector and a receptacle connector according to an embodiment of the present invention.

Hereinafter, exemplary embodiments of the present invention will be described in detail with reference to the drawings. In the present specification, reference now should be made to the drawings, in which the same reference numerals are used throughout the different drawings to designate the same or similar components. Further, in the description of the present invention, detailed descriptions of related well-known functions or configurations that are determined to unnecessarily obscure the gist of the present invention will be omitted.

Figure 2:
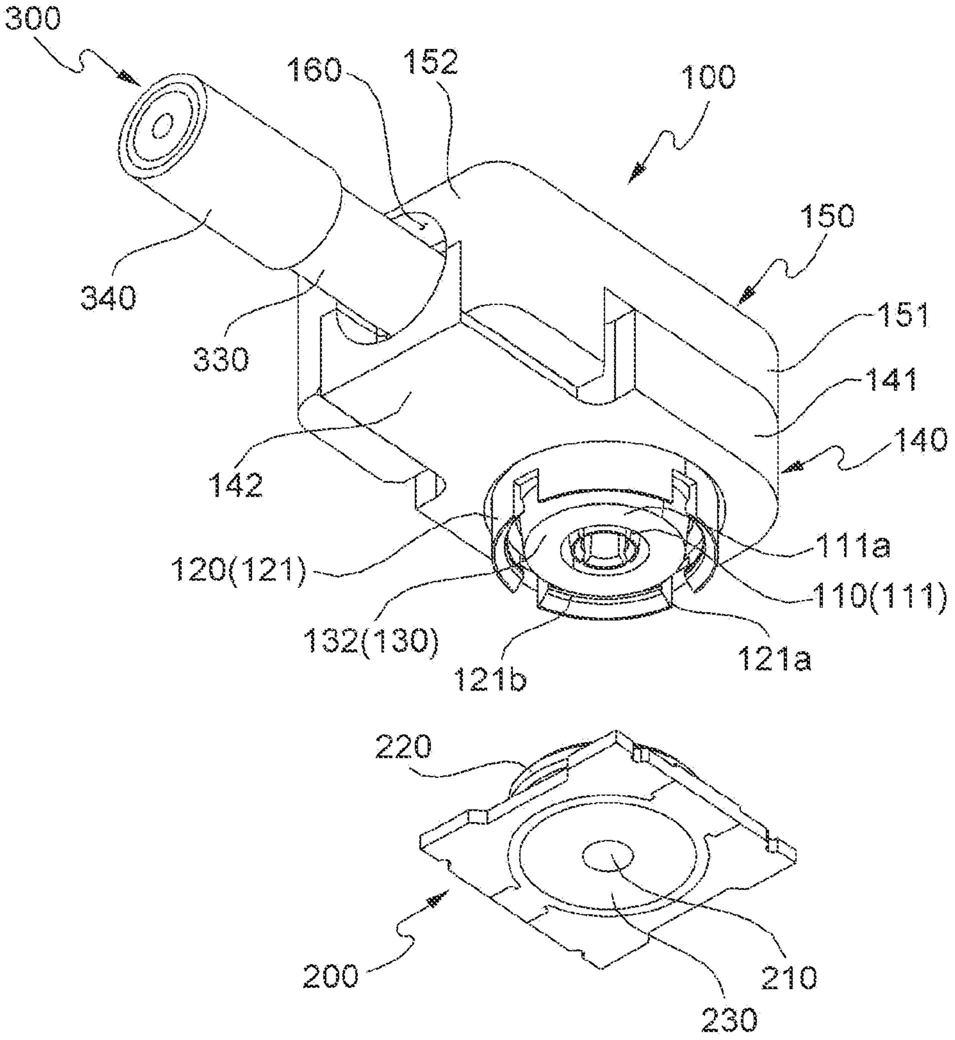
FIG. 2 is a bottom view of the plug connector and the receptacle connector according to an embodiment of the present invention.
Figure 3:
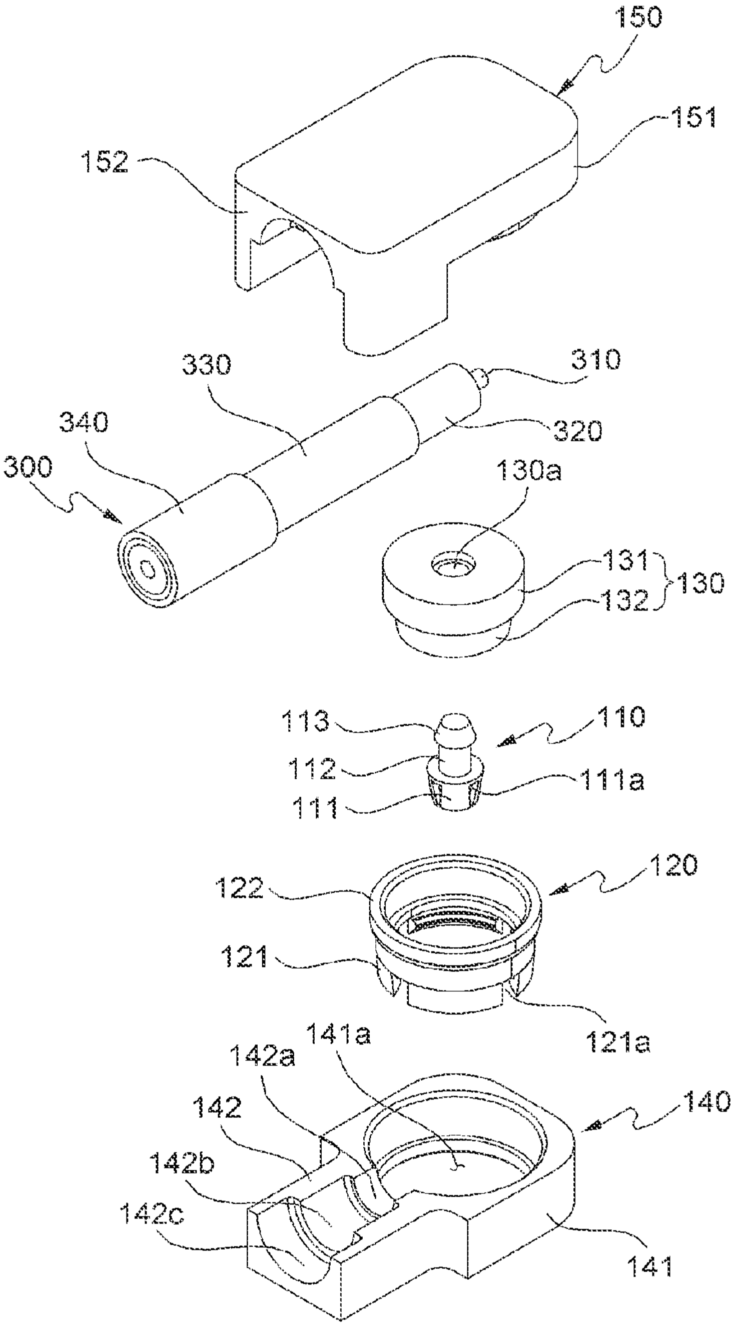
FIG. 3 is an exploded view from above of the plug connector.
Figure 4:
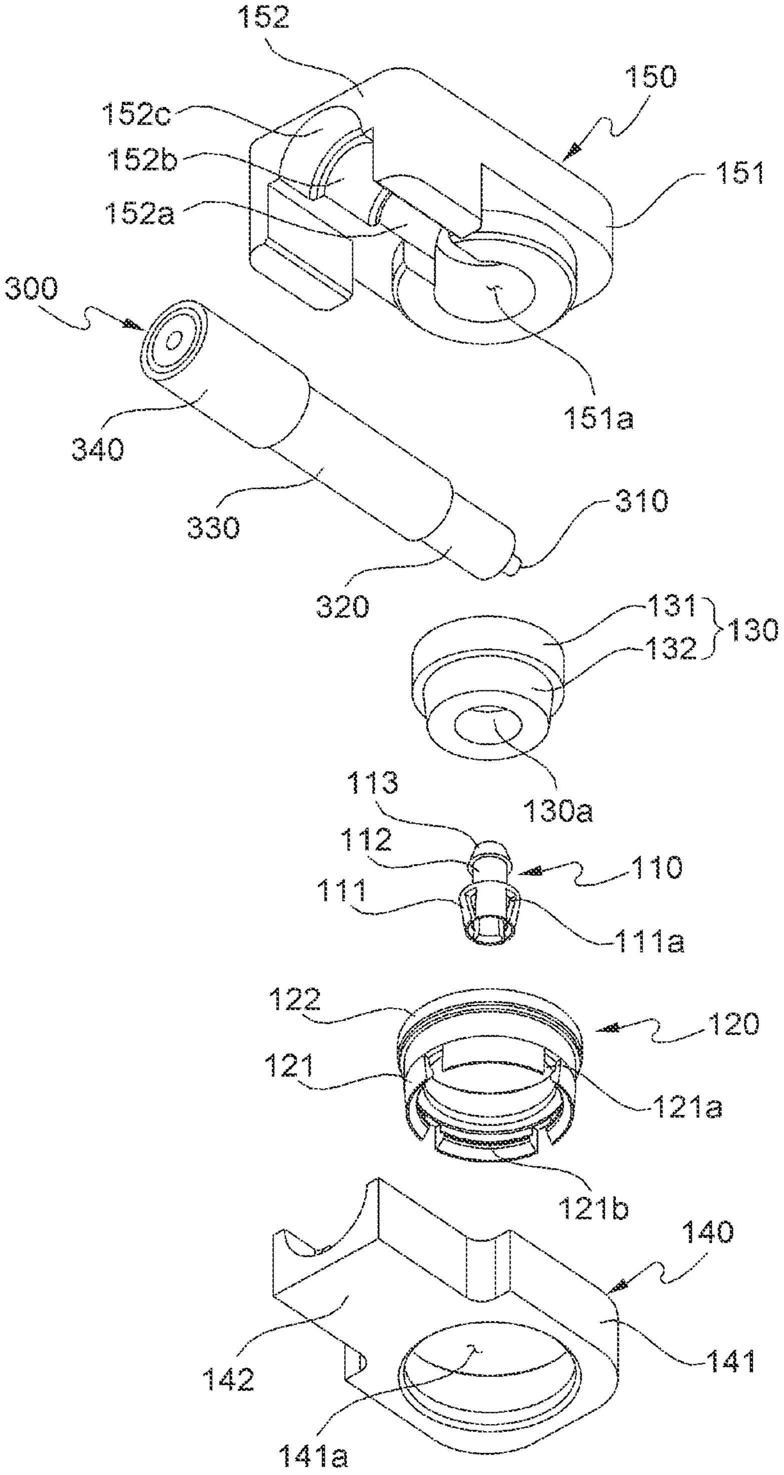
FIG. 4 is an exploded view from below of the plug connector.
Figure 5:
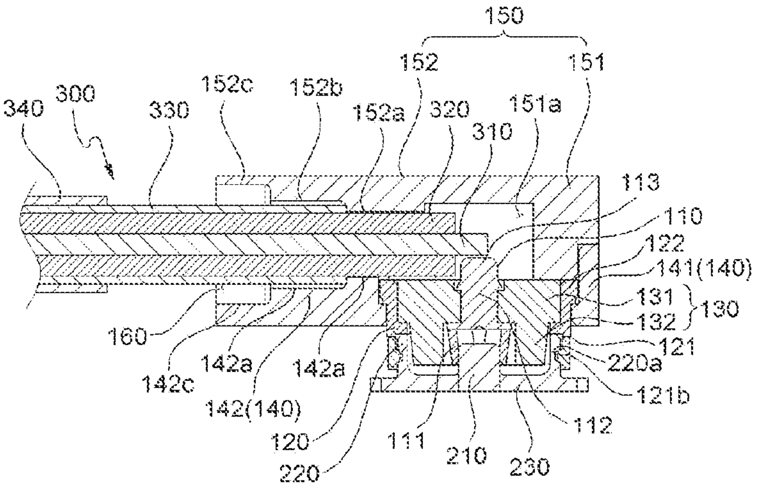
FIG. 5 is a cross-sectional view of a state in which the plug connector and the receptacle connector are coupled to each other.

FIGS. 1 to 5 are views of a plug connector according to an embodiment of the present invention. FIG. 1 is a top view of a plug connector and a receptacle connector, FIG. 2 is a bottom view of the plug connector and the receptacle connector, FIG. 3 is an exploded view from above of the plug connector, FIG. 4 is an exploded view from below of the plug connector, and FIG. 5 is a cross-sectional view of a state in which the plug connector and the receptacle connector are coupled to each other.

A plug connector 100 according to an embodiment of the present invention is coupled to a receptacle connector 200. The receptacle connector 200 may be mounted on a circuit board in various ways. Alternatively, the receptacle connector 200 may be formed integrally with the circuit board, rather than being a separate component. The receptacle connector 200 may include a columnar conductor 210 for signals, a ring-shaped conductor 220 for ground that surrounds the conductor 210 for signals, and a ring-shaped insulator 230 that insulates between the conductor 210 for signals and the conductor 220 for ground. However, the illustrated receptacle connector 220 is merely an example, and those skilled in the art will appreciate that the plug connector 100 according to the present invention can be coupled to receptacle connectors of various shapes and structures.

The plug connector 100 according to the present embodiment may include a conductor 110 for signals, a conductor 120 for ground, an insulator 130, a lower body 140, and an upper body 150.

The conductor 110 for signals is provided to make electrical contact with the conductor 210 for signals of the receptacle connector 200. The conductor 110 for signals includes a lower portion 111, a middle portion 112, and an upper portion 113. A hollow portion may be formed on the lower portion 111 of the conductor 110 for signals and the conductor 210 for signals of the receptacle connector 200 may be inserted into the hollow portion and thus make electrical contact. The lower portion 111 of the conductor 110 for signals may be formed in a tapered manner and have a cut-out groove 111*a* formed thereon so that the conductor 210 for signals of the receptacle connector 200 may make more stably contact with the conductor 110 for signals.

The conductor 120 for ground is provided to make electrical contact with the conductor 220 for ground of the receptacle connector 200. The conductor 120 for ground is formed in a ring shape to surround the conductor 110 for signals. The conductor 120 for ground includes a lower portion 121 and an upper portion 122. The conductor 220 for ground of the receptacle connector 200 may be inserted into the lower portion 121 so that the inner circumferential surface of the lower portion 212 may be in electrical contact with the outer circumferential surface of the conductor 220 for ground. The lower portion 121 of the conductor 120 for ground may be formed in a tapered manner and have a cut-out groove 121*a* so that the conductor 220 for ground of the receptacle connector 200 may make more stable contact with the conductor 120 for ground. In addition, a concave portion 220*a* may be formed along the outer circumference of the conductor 220 for ground of the receptacle connector 200 and a convex portion 121*b* may be formed along the inner circumference of the lower portion 121, so that as the convex portion 121*b* is engaged with the concave portion 220*a*, the plug connector 100 and the receptacle connector 200 can be more firmly coupled to each other.

The insulator 130 is formed in a ring shape such that it is surrounded by the conductor 120 for ground while enclosing the conductor 110 for signals to insulate between the conductor 110 for signals and the conductor 120 for ground. The insulator 130 includes a first portion 131 and a second portion 132 below the first portion 131. The lower portion 111 of the conductor 110 for signals protrudes below the first portion 131, the middle portion 112 of the conductor 110 for signals is inserted into a hollow portion 130*a* of the first portion 131, and the upper portion 113 of the conductor 110 for signals protrudes above the first portion 131. The lower portion 121 of the conductor 120 for ground protrudes below the first portion 131, and the upper portion 122 of the conductor 120 for ground surrounds the first portion 131. A stepped portion may be formed on the inner circumferential surface of the conductor 120 for ground so that the lower edge of the first portion 131 may be seated on the stepped portion. The second portion 132 of the insulator 130 is formed to be surrounded by the lower portion 121 of the conductor 120 for ground while surrounding the lower portion 111 of the conductor 110 for signals. Also, the second portion 132 is formed to have an outer diameter smaller than the inner diameter of the conductor 220 for ground so as to be inserted into the conductor 220 for ground of the receptacle connector 220. The second portion 132 serves to guide the conductor 110 for signals and the conductor 120 for ground of the plug connector 100 to the conductor 210 for signals and the conductor 220 for ground of the receptacle connector 200 while protecting the lower portion 111 of the conductor 110 for signals.

The lower body 140 may include a lower housing 141 and a lower guide portion 142. The lower housing 141 has a vertically open hollow portion 141a formed therein, and the upper portion 122 of the conductor 120 for ground is accommodated in the hollow portion 141a. The lower portion 121 of the conductor 120 for ground and the lower portion 111 of the conductor 110 for signals are exposed downward through the lower housing 141. A stepped portion is formed along the inner circumference of the hollow portion 141a of the lower body 140 and a locking step is formed along the outer circumference of the upper portion 122 of the conductor 120 for ground so that the locking step can be seated on the stepped portion.

The upper body 150 may be coupled onto the lower body 140 and may include an upper housing 151 and an upper guide portion 152. The upper housing 151 faces the lower housing 141 and has a hollow portion 151a opened downwards so that the hollow portion 151a forms a space around the upper portion 113 of the conductor 110 for signals.

The lower guide portion 142 guides the cable 300 toward the conductor 110 for signals from one side of the lower housing 141. The upper guide portion 152 faces the lower guide portion 142 and guides, together with the lower guide portion 142, the cable 300 toward the conductor 110 for signals from one side of the upper housing 151. The lower guide portion 142 and the upper guide portion 152 form a guide tube 160 that guides the cable 300 toward the conductor 110 for signals.

The cable 300 may be guided toward the conductor 110 for signals through the lower guide portion 142 and the upper guide portion 152, so that an end of a signal line 310 of the cable 300 can be located above the upper portion 113 of the conductor 110 for signals. In addition, the upper portion 113 of the conductor 110 for signals may be electrically coupled to the signal line 310 of the cable 300 through soldering.

The cable 300 may include the signal line (internal conductor) 310, an outer conductor 330 configured to shield electromagnetic waves of the signal line 310 and made of aluminum, copper, or the like, a dielectric 320 configured to insulate and separate between the signal line 310 and the outer conductor 330, and a sheath (jacket) 340 configured to protect the outer conductor 330. The cable 300 may include a portion where the signal line 310 is exposed, a portion where the dielectric 320 is exposed, and a portion where the outer conductor 330 is exposed, in order from the end of the conductor 110 for signals.

The lower guide portion 142 may include a first lower guide groove 142a, a second lower guide groove 142b, and a third lower guide groove 142c in order closest to the hollow portion 141a of the lower body 140.

The upper guide portion 152 may include a first upper guide groove 152a, a second upper guide groove 152b, and a third upper guide groove 152 in order closest to the hollow portion 151a of the upper body 150. The first upper guide groove 152a, the second upper guide groove 152b, and the third upper guide groove 152c face the first lower guide groove 142a, the second lower guide groove 142b, and the third guide groove 142c, respectively.

When the lower body 140 and the upper body 150 are coupled to each other, the first to third lower guide grooves 142a, 142b, and 142c and the first to third upper guide grooves 152a, 152b, and 152c form a guide tube 160 that guides the cable 300 toward the conductor 110 for signals.

The exposed dielectric 320 of the cable 300 may be seated in the first lower guide groove 142a and the first upper guide groove 152a, and the exposed outer conductor 330 of the cable 300 may be seated in the second lower guide groove 142b and the second upper guide groove 152b. The first lower guide groove 142a and the first upper guide groove 152a of the guide tube 160 may be formed such that the inner diameter thereof corresponds to the outer diameter of the exposed dielectric 320 of the cable 300, and the second lower guide groove 142b and the second upper guide groove 152b may be formed such that the inner diameter thereof corresponds to the outer diameter of the exposed outer conductor 330 of the cable 300.

The portion where the outer conductor 330 of the cable 300 may extend to the outside of the guide tube 160. In addition, the third lower guide groove 142c and the third upper guide groove 152c of the guide tube 160 may be formed such that the inner diameter thereof is greater than the outer diameter of the exposed outer conductor 330 of the cable 300. That is, the guide tube 160 may be formed such that the inner diameter of the inlet thereof is greater than the outer diameter of the exposed outer conductor 330 of the cable 300. Accordingly, a soldering portion may be formed between an inlet portion of the guide tube 160 (i.e., the third lower guide groove 142c and the third upper guide groove 152c of the guide tube 160) and the exposed outer conductor 330 of the cable 300, thereby electrically coupling the exposed outer conductor 330 of the cable 300, the lower body 140, and the upper body 150.

The lower body 140 and the upper body 150 may be made of a conductive material. Accordingly, the lower body 140 and the upper body 150 may provide excellent shielding performance.

FIGS. 6A to 6E are views illustrating a process of connecting a plug connector and a cable.

Figure 6A:
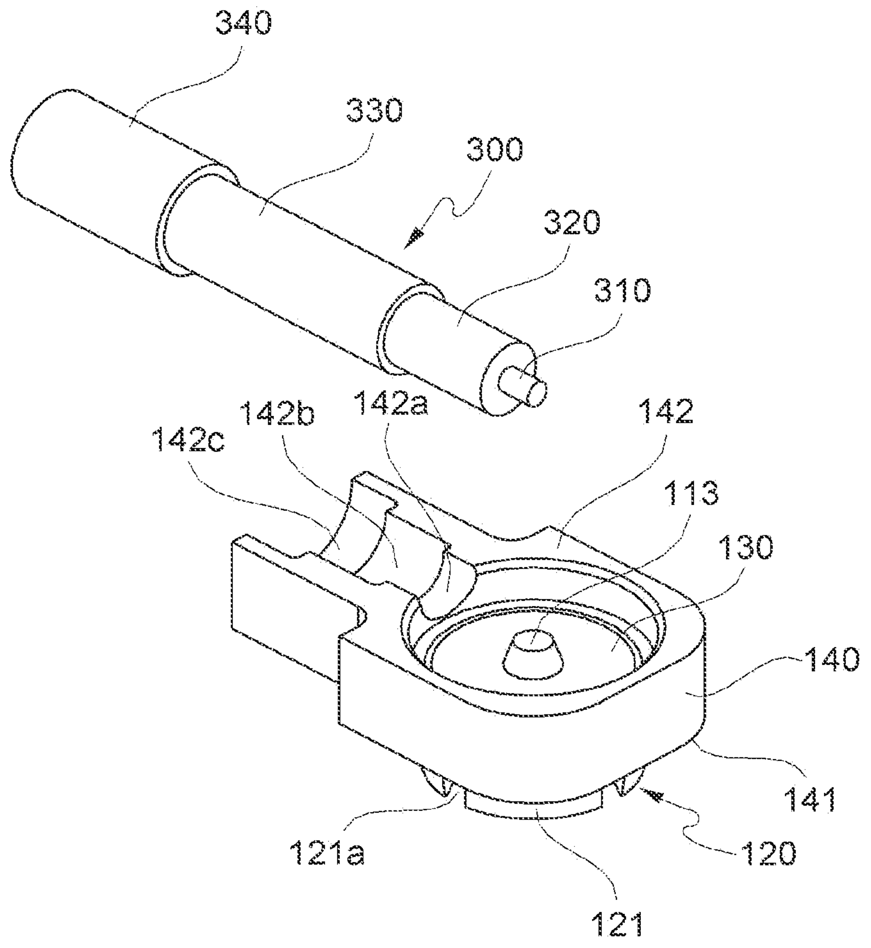
FIGS. 6A to 6E are views illustrating a process of connecting a plug connector and a cable.

Referring to FIG. 6A, a cable 300 in which a signal line 310, a dielectric 320, and an outer conductor 330 are exposed is aligned on the lower body 140, while the upper body 150 is open.

Figure 6B:
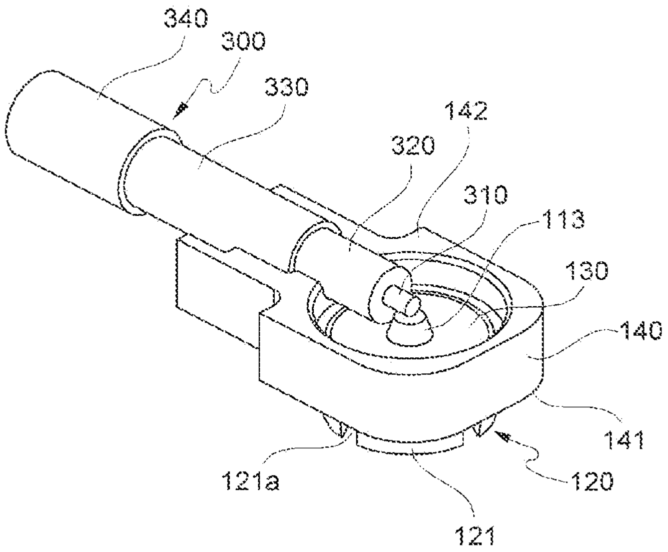

Referring to FIG. 6B, the cable 300 is seated in the first to third lower guide grooves 142a, 142b, and 142c such that the end of the signal line 310 is located above the upper portion 113 of the conductor 110 for signals.

Figure 6C:
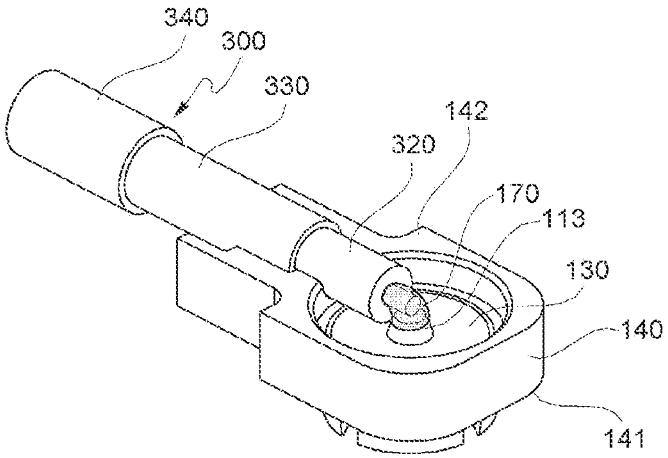

Referring to FIG. 6C, the exposed signal line 310 of the cable 300 and the upper portion 113 of the conductor 110 for signals are soldered to form a first soldering portion 170.

Figure 6D:
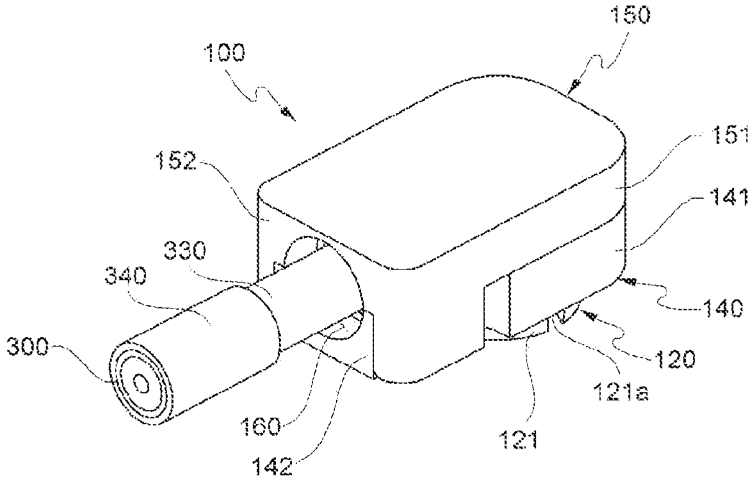

Referring to FIG. 6D, the upper body 150 is coupled onto the lower body 140.

Figure 6E:
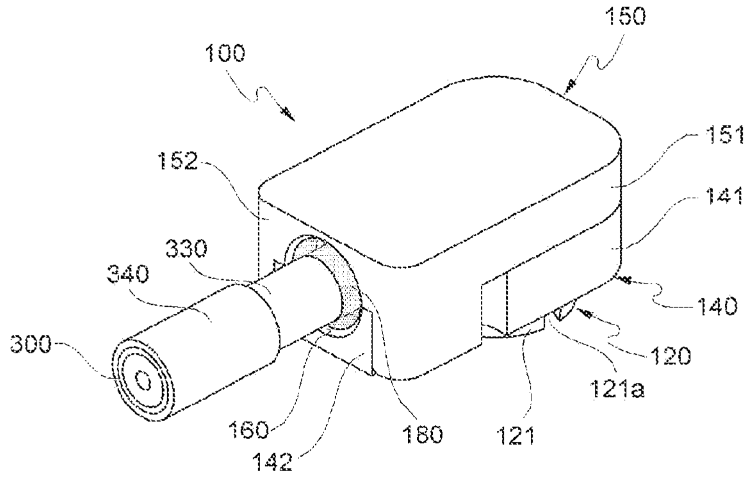

Referring to FIG. 6E, a second soldering portion 180 is formed by soldering an inlet portion of the guide tube 160.

Figure 7:
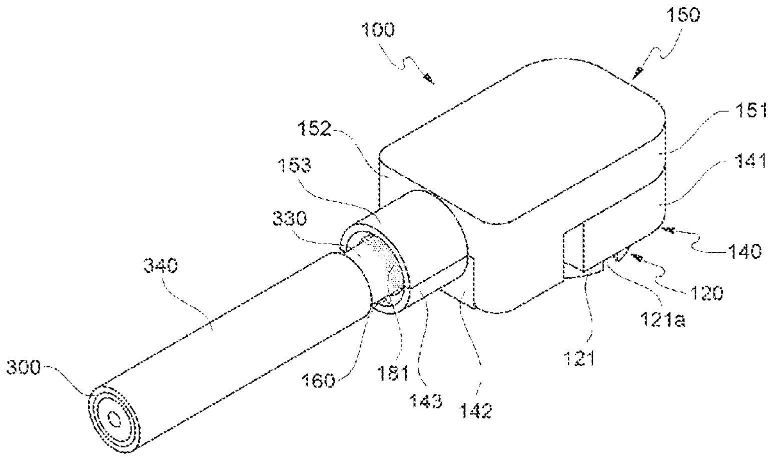
FIG. 7 is a view of a plug connector according to a modified embodiment of the present invention.

FIG. 7 is a view of a plug connector according to a modified embodiment of the present invention.

A lower neck portion 143 and an upper neck portion 153 protrude respectively from one sides of a lower guide portion 142 and an upper guide portion 143 to surround an exposed outer conductor 330 of a cable 300 at a distance. Accordingly, a second soldering portion 181 may be formed between inlet portions of the lower neck portion 143 and the upper neck portion 153 and the outer conductor 330.

Figure 8:
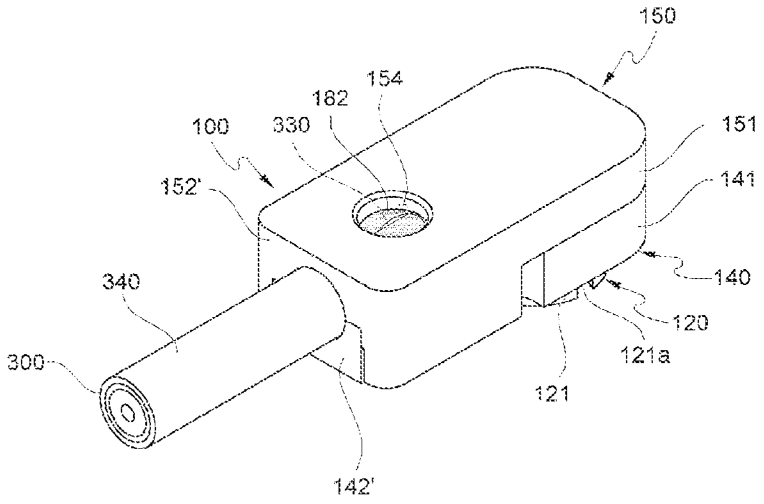
FIG. 8 is a view of a plug connector according to another modified embodiment of the present invention.

FIG. 8 is a view of a plug connector according to another modified embodiment of the present invention.

A lower guide portion 142' and an upper guide portion 152' may be elongated to cover a sheath (jacket) 340 so that an outer conductor 330 of the cable 300 is not exposed to the outside. In addition, a through hole 154 is vertically formed at a portion of the upper guide portion 152' where the outer conductor 330 is located. In the same manner, a through hole (not shown) may be vertically formed at a portion of the lower guide portion 142' where the outer conductor 330 is located. Accordingly, a second soldering portion 182 may be formed on the outer conductor 330 in the through hole 154 and around the outer conductor 330.

A number of exemplary embodiments have been particularly shown and described with reference to certain exemplary embodiments thereof. It will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the exemplary embodiments is defined not by the detailed description of the exemplary embodiments but by the following claims, and all differences within the scope will be construed as being included in the exemplary embodiments.

INDUSTRIAL APPLICABILITY

The present invention can be efficiently applied in the field of manufacturing and developing electrical connectors.

The invention claimed is:

1. A plug connector coupled to a receptacle connector, the plug connector comprising:

a conductor for signals;

a ring-shaped conductor for ground, the conductor surrounding the conductor for signals;

a ring-shaped insulator surrounding the conductor for signals and being surrounded by the conductor for ground, and insulating between the conductor for signals and the conductor for ground;

a lower body; and an upper body coupled onto the lower body, wherein the conductor for signals comprises a lower portion protruding below a first portion on the insulator, a middle portion inserted into a hollow portion of the first portion, and an upper portion protruding above the first portion, wherein the conductor for ground comprises a lower portion protruding below the first portion and an upper portion surrounding the first portion, wherein the lower body comprises a lower housing having a hollow portion that is vertically opened, wherein the upper portion of the conductor for ground is accommodated in the hollow portion, and the lower portion of the conductor for ground and the lower portion of the conductor for signals are exposed downward through the hollow portion, wherein the upper body comprises an upper housing facing the lower housing and having a hollow portion opened downwards so that the hollow portion forms a space around the upper portion of the conductor for signals, wherein the lower body further comprises a lower guide portion configured to guide a cable toward the conductor for signals from one side of the lower housing, and the upper body further comprises an upper guide portion facing the lower guide portion and configured to guide the cable toward the conductor for signals from one side of the upper housing, and wherein the lower guide portion and the upper guide portion form a guide tube that guides the cable, and the guide tube is formed such that an inner diameter of an inlet thereof is greater than an outer diameter of an outer conductor of the cable.

2. The plug connector of claim 1, wherein a soldering portion is formed between an inlet portion of the guide tube and the outer conductor of the cable.

3. The plug connector of claim 1, wherein:

the lower guide portion comprises a first lower guide groove, a second lower guide groove, and a third lower guide groove in order closest to the hollow portion of the lower body, the upper guide portion comprises a first upper guide groove, a second upper guide groove, and a third upper guide groove that face, respectively, the first lower guide groove, the second lower guide groove, and the third guide groove, an exposed dielectric of the cable is seated in the first lower guide groove and the first upper guide groove, an exposed outer conductor of the cable is seated in the second lower guide groove and the second upper guide groove, and an inner diameter formed by the third lower guide groove and the third upper guide groove is greater than an outer diameter of the outer conductor of the cable.

4. A plug connector coupled to a receptacle connector, the plug connector comprising:

a conductor for signals;

a ring-shaped conductor for ground, the conductor surrounding the conductor for signals;

a ring-shaped insulator surrounding the conductor for signals and being surrounded by the conductor for ground, and insulating between the conductor for signals and the conductor for ground;

a lower body; and an upper body coupled onto the lower body, wherein the conductor for signals comprises a lower portion protruding below a first portion on the insulator, a middle portion inserted into a hollow portion of the first portion, and an upper portion protruding above the first portion, wherein the conductor for ground comprises a lower portion protruding below the first portion and an upper portion surrounding the first portion, wherein the lower body comprises a lower housing having a hollow portion that is vertically opened, wherein the upper portion of the conductor for ground is accommodated in the hollow portion, and the lower portion of the conductor for ground and the lower portion of the conductor for signals are exposed downward through the hollow portion, wherein the upper body comprises an upper housing facing the lower housing and having a hollow portion opened downwards so that the hollow portion forms a space around the upper portion of the conductor for signals, wherein the lower body further comprises a lower guide portion configured to guide a cable toward the conductor for signals from one side of the lower housing, and the upper body further comprises an upper guide portion facing the lower guide portion and configured to guide the cable toward the conductor for signals from one side of the upper housing, and wherein a lower neck portion and an upper neck portion protrude respectively from one sides of the lower guide portion and the upper guide portion to surround an exposed outer conductor of the cable at a distance, and a soldering portion is formed between inlet portions of the lower neck portion and the upper neck portion and the outer conductor.

5. A plug connector coupled to a receptacle connector, the plug connector comprising:

a conductor for signals;

a ring-shaped conductor for ground, the conductor surrounding the conductor for signals;

a ring-shaped insulator surrounding the conductor for signals and being surrounded by the conductor for ground, and insulating between the conductor for signals and the conductor for ground;

a lower body; and an upper body coupled onto the lower body, wherein the conductor for signals comprises a lower portion protruding below a first portion on the insulator, a middle portion inserted into a hollow portion of the first portion, and an upper portion protruding above the first portion, wherein the conductor for ground comprises a lower portion protruding below the first portion and an upper portion surrounding the first portion, wherein the lower body comprises a lower housing having a hollow portion that is vertically opened, wherein the upper portion of the conductor for ground is accommodated in the hollow portion, and the lower portion of the conductor for ground and the lower portion of the conductor for signals are exposed downward through the hollow portion, wherein the upper body comprises an upper housing facing the lower housing and having a hollow portion opened downwards so that the hollow portion forms a space around the upper portion of the conductor for signals, wherein the lower body further comprises a lower guide portion configured to guide a cable toward the conductor for signals from one side of the lower housing, and the upper body further comprises an upper guide portion facing the lower guide portion and configured to guide the cable toward the conductor for signals from one side of the upper housing, and wherein the lower guide portion and the upper guide portion are formed to cover a sheath of the cable, a through hole is vertically formed at a portion of the lower guide portion or the upper guide portion where an exposed outer conductor of the cable is located, and a soldering portion is formed on the outer conductor in the through hole and around the outer conductor.

* * * * *